US010145492B2

(12) United States Patent
Ayala, Jr. et al.

(10) Patent No.: US 10,145,492 B2
(45) Date of Patent: Dec. 4, 2018

(54) VALVE LOCKOUT DEVICE WITH VIEWING PORT AND METHOD

(71) Applicant: Surelock, LLC, Moses Lake, WA (US)

(72) Inventors: Guadalupe Ayala, Jr., Pasco, WA (US); Edgardo Ayala, Moses Lake, WA (US)

(73) Assignee: Surelock, LLC, Moses Lake, WA (US)

( * ) Notice: Subject to any disclaimer, the term of this patent is extended or adjusted under 35 U.S.C. 154(b) by 0 days.

(21) Appl. No.: 15/635,163

(22) Filed: Jun. 28, 2017

(65) Prior Publication Data

US 2018/0017181 A1    Jan. 18, 2018

Related U.S. Application Data

(60) Provisional application No. 62/362,575, filed on Jul. 14, 2016.

(51) Int. Cl.
*F16K 35/10* (2006.01)
*F16K 31/60* (2006.01)
*F16K 37/00* (2006.01)

(52) U.S. Cl.
CPC .............. *F16K 35/10* (2013.01); *F16K 31/60* (2013.01); *F16K 37/0058* (2013.01)

(58) Field of Classification Search
CPC ................................. F16K 35/10; F16K 31/60
USPC .................................................. 70/178–186
See application file for complete search history.

(56) References Cited

U.S. PATENT DOCUMENTS

| | | | | |
|---|---|---|---|---|
| 3,391,554 | A * | 7/1968 | Wrenshall | F16K 35/10 70/178 |
| 4,254,888 | A * | 3/1981 | Chandler | B60K 15/0409 220/210 |
| 5,090,447 | A | 2/1992 | Lewis | |
| 5,092,359 | A * | 3/1992 | Wirth | E21B 34/02 137/382 |
| 5,238,141 | A * | 8/1993 | Callegari | F17C 13/002 137/382 |
| 5,797,415 | A * | 8/1998 | Nicholson | F16L 59/16 137/15.01 |
| 5,950,462 | A * | 9/1999 | Neeley | E05B 13/001 70/175 |
| 6,105,484 | A * | 8/2000 | Kalthoff | F16K 35/10 92/17 |
| 6,170,306 | B1 * | 1/2001 | Kitley | F16K 35/10 137/382 |
| 6,206,033 | B1 * | 3/2001 | Chang | F16K 35/10 137/377 |
| 6,382,001 | B1 * | 5/2002 | Neeley | E05B 13/001 70/175 |
| 7,197,904 | B2 * | 4/2007 | Marcelle | F16K 35/10 70/164 |
| 8,074,960 | B2 * | 12/2011 | Milbeck | F16K 35/10 251/90 |

(Continued)

*Primary Examiner* — Suzanne L Barrett
*Assistant Examiner* — Suzanne D Barrett
(74) *Attorney, Agent, or Firm* — Lee & Hayes, PC

(57) ABSTRACT

A valve lockout device with viewing port is disclosed herein. The valve lockout device with viewing port includes a first clamshell member, a second clamshell member, and a hinge pivotably connecting the first clamshell member and second clamshell member. The valve lockout device with viewing port is useful for observing the operational state of a valve when it is locked out for maintenance tasks.

14 Claims, 5 Drawing Sheets

(56) References Cited

U.S. PATENT DOCUMENTS

| | | | | |
|---|---|---|---|---|
| 8,770,220 B1* | 7/2014 | Embry | ............ | A62C 35/20 |
| | | | | 137/382 |
| 9,576,754 B2* | 2/2017 | Arnst | ............ | H01H 9/287 |
| 2003/0173490 A1* | 9/2003 | Lappen | ............ | B23Q 1/01 |
| | | | | 248/678 |
| 2004/0090014 A1* | 5/2004 | Bylina | ............ | F16J 15/187 |
| | | | | 277/510 |
| 2007/0240766 A1* | 10/2007 | Brojanac | ............ | E05L 367/383 |
| | | | | 137/385 |
| 2012/0047973 A1* | 3/2012 | Su | ............ | G05G 5/02 |
| | | | | 70/174 |
| 2013/0099641 A1* | 4/2013 | Saucier | ............ | A47G 29/10 |
| | | | | 312/237 |
| 2014/0116536 A1* | 5/2014 | Resendiz | ............ | F16K 35/10 |
| | | | | 137/377 |
| 2017/0130865 A1* | 5/2017 | Bender | ............ | F16K 35/10 |
| 2017/0138504 A1* | 5/2017 | Hoots | ............ | F16K 35/10 |

* cited by examiner

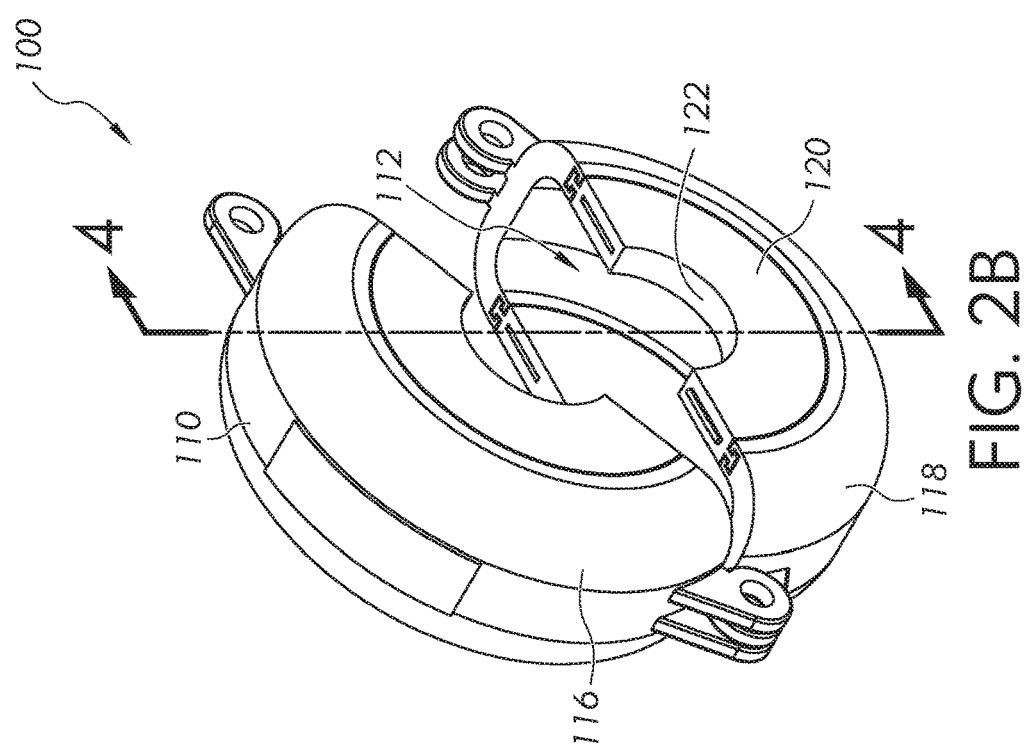
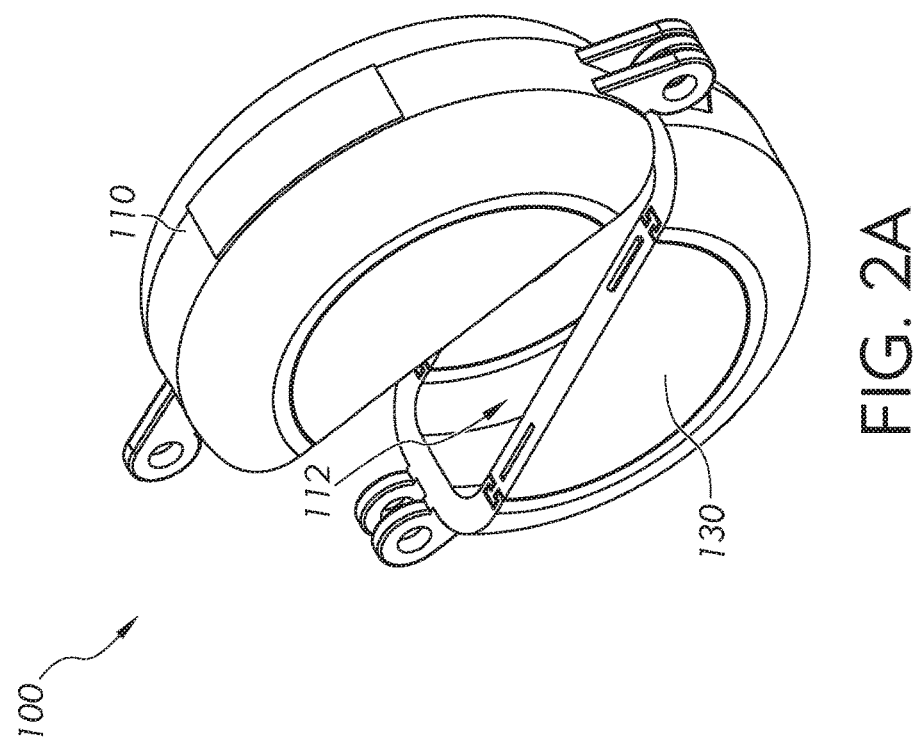

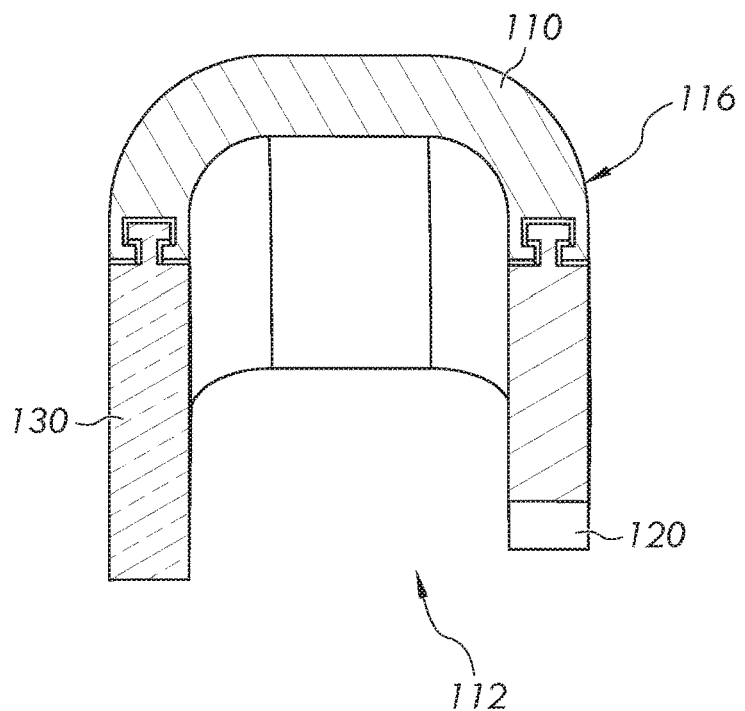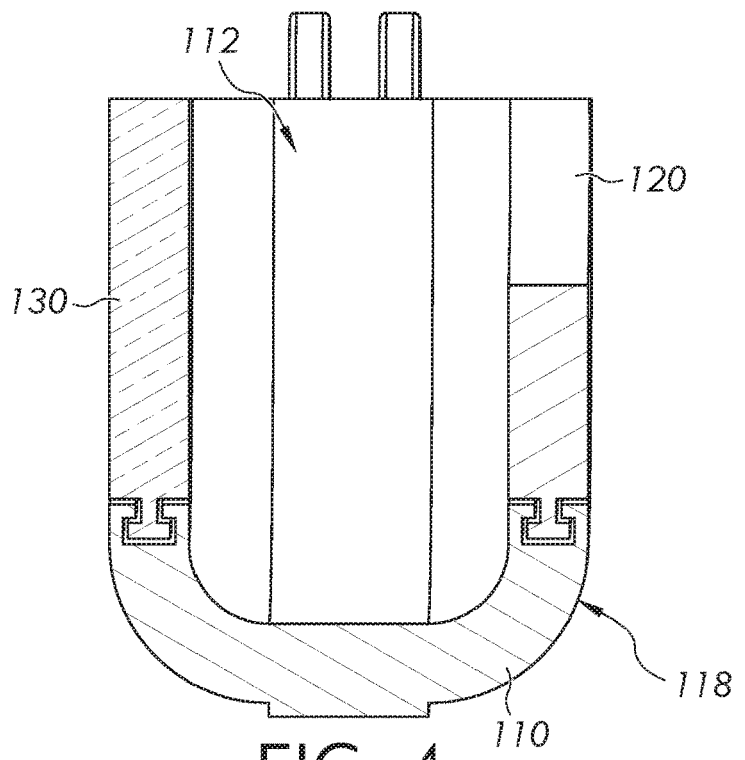
FIG. 4

VALVE LOCKOUT DEVICE WITH VIEWING PORT AND METHOD

CROSS-REFERENCE TO RELATED APPLICATION(S)

The present application is related to and claims priority to U.S. Provisional Patent Application No. 62/362,575 filed Jul. 14, 2016, which is incorporated by reference herein in its entirety.

BACKGROUND OF THE DISCLOSURE

The following includes information that may be useful in understanding the present disclosure. It is not an admission that any of the information provided herein is prior art nor material to the presently described or claimed disclosures, nor that any publication or document that is specifically or implicitly referenced is prior art.

TECHNICAL FIELD

The present disclosure relates generally to the field of security devices of existing art and more specifically relates to lockout devices.

RELATED ART

Donut style ball valve lock out devices are necessary to prevent tampering and isolate the valve from operation. However, current lock out devices are opaque structures, which do not allow workers to see the valve configuration within the device. This can result in a disgruntled worker maliciously manipulating the valve and forging the paperwork. It can also lead to simple human error where the valve is locked out in the wrong position. In either of these scenarios, it is not possible for an individual to check the positioning of the valve without removing the lock out device. This can lead to damages, injuries, and even death. A suitable solution is desired.

U.S. Pat. No. 5,090,447 to Leslie B. Lewis and Timothy Robinson relates to a transparent ball valve assembly. The described transparent ball valve assembly includes thermoplastic valve assembly for use in controlling the flow of corrosive fluids comprising a transparent housing having a passageway through which fluid may flow, a transparent ball disposed in the passageway for rotation between an open position and a closed position, and transparent connector means for connecting the valve housing to a pipeline thereby enabling an operator to visually detect alignment of the ball, turbulence in the through passageway and wear and corrosion of the valve components.

SUMMARY OF THE DISCLOSURE

In view of the foregoing disadvantages inherent in the known lockout device art, the present disclosure provides a novel valve lockout device with viewing port and method. The general purpose of the present disclosure, which will be described subsequently in greater detail, is to provide a valve lockout device with viewing port and method.

A lockout device is disclosed herein. The lockout device may include a handle cover, a shaft interface, and a viewport. The handle cover may include a handle cavity within for containing a valve handle, in such a way that the valve handle may be shielded without engaging the handle cover. The handle cover restricts access to the valve handle when the lockout device is attached to the valve. The shaft interface is integrated with the handle cover, and includes an aperture which encircles a shaft of the valve handle without engaging it. The viewport may also be integrated with the handle cover, and is positioned parallel to the top of the valve handle. The viewport enables a user to view whether the valve is opened or closed when the lockout device is attached to the valve.

According to another embodiment, a method for securing a valve is also disclosed herein. The method of securing a valve during maintenance tasks may include firstly, closing two bifurcated halves of the lockout device about the valve handle, in such a way that they enclose the handle without engaging it; secondly, locking the two bifurcated halves together about the valve handle; thirdly, observing through a viewport whether the valve is on or off; fourthly, performing a maintenance task, particularly downstream of the valve; fifthly, unlocking the two bifurcated halves from each other; sixthly, opening the two halves from about the valve handle; and seventhly, removing the lockout device from the valve. In this way, the lockout device may be used to secure a valve during maintenance tasks, particularly when maintenance personnel are working on a conduit downstream of the valve.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and methods of use for the present disclosure, a valve lockout device with viewing port and method, constructed and operative according to the teachings of the present disclosure.

FIG. 2A is a front perspective view of the lockout device according to another embodiment of the disclosure.

FIG. 2B is a back perspective view of the lockout device of FIG. 2A.

FIG. 4 is a cutaway view of the lockout device of FIG. 2B, along line 4-4.

The various embodiments of the present disclosure will hereinafter be described in conjunction with the appended drawings, wherein like designations denote like elements.

DETAILED DESCRIPTION

As discussed above, embodiments of the present disclosure relate to a lockout device and more particularly to a valve lockout device with viewing port and method as used to improve the securing of a valve during maintenance tasks.

Generally, the present disclosure provides a user with a means to lockout a valve and visually check whether or not a device is properly locked out. According to one embodiment, the device includes a transparent ball valve lock out device having two hinged members which enclose a valve handle. When the two members are closed together, the device forms a cover which encloses a valve handle without engaging it, thereby preventing manipulation of the valve by an unauthorized user. One side of the device includes an aperture configured to enclose about a shaft of the valve, while the other side is placed adjacent to the top of the valve handle, and is transparent so that the valve handle may be viewed through the device. The device may include color coded edges to indicate hazards of the fluid controlled by the valve. Different colors may represent different fluid compositions and hazard levels.

In use, the device may eliminate the chances of a ball valve being locked out in the incorrect configuration. The device may prevent workers from having to remove the entire lock out device to check the configuration, instead allowing a user to observe the configuration of the valve through the transparent port in the lockout device. The device may reduce the risk of individuals manipulating a ball valve in regards to both damage costs and injuries.

Referring now more specifically to the drawings by numerals of reference, there is shown in FIGS. 1-4, various views of a lockout device 100. Upon reading this specification, it should be appreciated that, under appropriate circumstances, considering such issues as user preferences, design preference, structural requirements, marketing preferences, cost, available materials, technological advances, etc., other lockout device arrangements such as, for example, shapes accommodating alternative handle styles, etc., may be sufficient.

Figure 1:
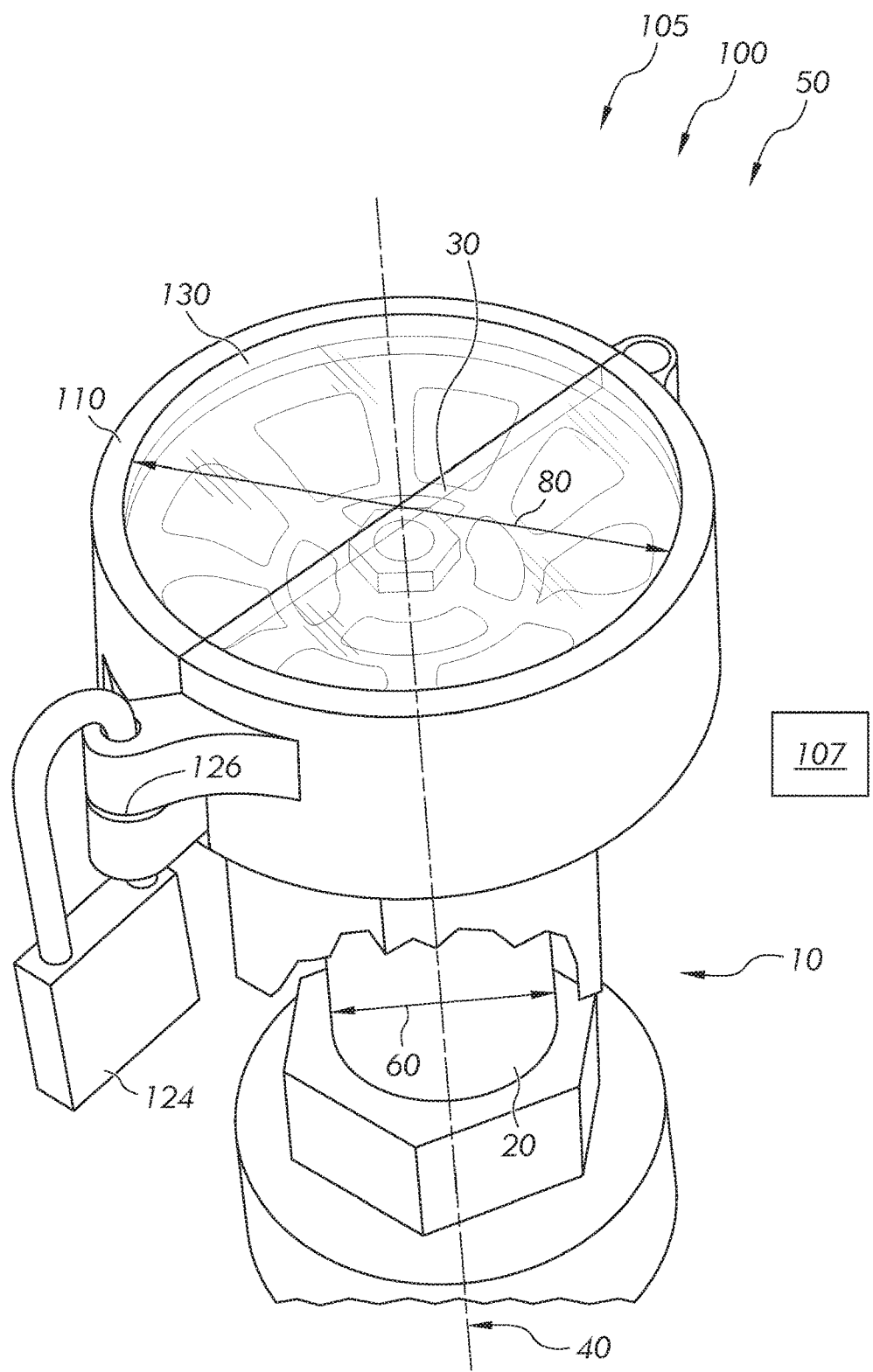
FIG. 1 is a partially cutaway perspective view of a lockout device during an 'in-use' condition, according to an embodiment of the present disclosure.

FIG. 1 shows a lockout device during an 'in-use' condition 50, according to an embodiment of the present disclosure. Here, the lockout device may be beneficial for use by a user to secure a valve 10 during maintenance tasks. In particular, the lockout device 100 is configured to circumscribe a rotating valve handle 30 about its shaft axis 40 without engaging the rotating valve handle 30, to restrict access to the rotating valve handle 30, and to circumscribe valve operation shaft 20 without engaging the rotating valve handle 30 shaft. For reference, and as is typical, the valve operation shaft 20 has a shaft diameter 60, the shaft diameter 60 being measured normal to shaft axis 40. Similarly, the rotating valve handle 30 has a maximum handle diameter 80, which may also be normal to the shaft axis 40.

The lockout device 100 may include a handle cover 110, a shaft interface 120 (FIG. 2), and a viewport 130. According to one embodiment, the handle cover 110 may be substantially cylindrical in shape. According to one embodiment, the lockout device 100 may be color-coded to match a composition of the fluid regulated by valve 10, and alternatively hazard level of the fluid regulated by valve 10. The color-coding may be selected from or otherwise defined by a color standard, such as defined by ANSI/ASME A13.1.

When installed, the lockout device 100 circumscribes portions of the valve 10, and is releasably attachable to valve 10. In particular, when installed, the handle cover 110 encloses rotating valve handle 30 about shaft axis 40 such that handle cover 110 does not engage rotating valve handle 30, with the handle cover 110 being configured to restrict access to rotating valve handle 30. Similarly, the shaft interface 120 (FIG. 2) circumscribes valve operation shaft 20 without engaging valve operation shaft 20.

Viewport 130 permits a user to see an operational condition of valve 10 when installed about rotating valve handle 30. For example, the rotating valve handle 30 includes a flow indicator or otherwise indicates a state of the valve 10, and the viewport 130 permits a user to see the indicator without removal of the lockout device 100. According to one embodiment, the viewport 130 may be strategically positioned relative to the particular valve's indication features (e.g., centered, offset, oblique angle, sidewall placement, etc.).

Lockout device may further include a locking device 124 and lock receiver 126 configured to receive locking device 124. The lock receiver 126 may be further configured to positively lock lockout device 100 in closed position or state, as illustrated.

According to one embodiment, the lockout device 100 may be arranged as a kit 105. In particular, the lockout device 100 may further include a set of instructions 107. The instructions 107 may detail functional relationships in relation to the structure of the lockout device 100 such that the lockout device 100 can be used, maintained, or the like, in a preferred manner.

FIG. 2A is a front perspective view of the lockout device according to another embodiment of the disclosure, and FIG. 2B is a back perspective view of the lockout device of FIG. 2A. Here, the lockout device 100 is illustrated in isolation and in an open state. As shown, the handle cover 110 defines a handle cavity 112. Also, according to one embodiment, the viewport 130 may be made of a transparent material.

The shaft interface 120 may be fixed or otherwise secured to the handle cover 110, or alternately may be integrated with the same, such that it merely is an aperture 122 in handle cover 110. Similarly, the viewport 130 may be interposed within handle cover 110, or alternately may be integrated with the same. Accordingly, the handle cover 110, the shaft interface 120, and the viewport 130 (or any combination thereof) may be integrated together. In such case, at least one of the handle cover 110, the shaft interface 120, and the viewport 130 may be bifurcated.

Figure 3:
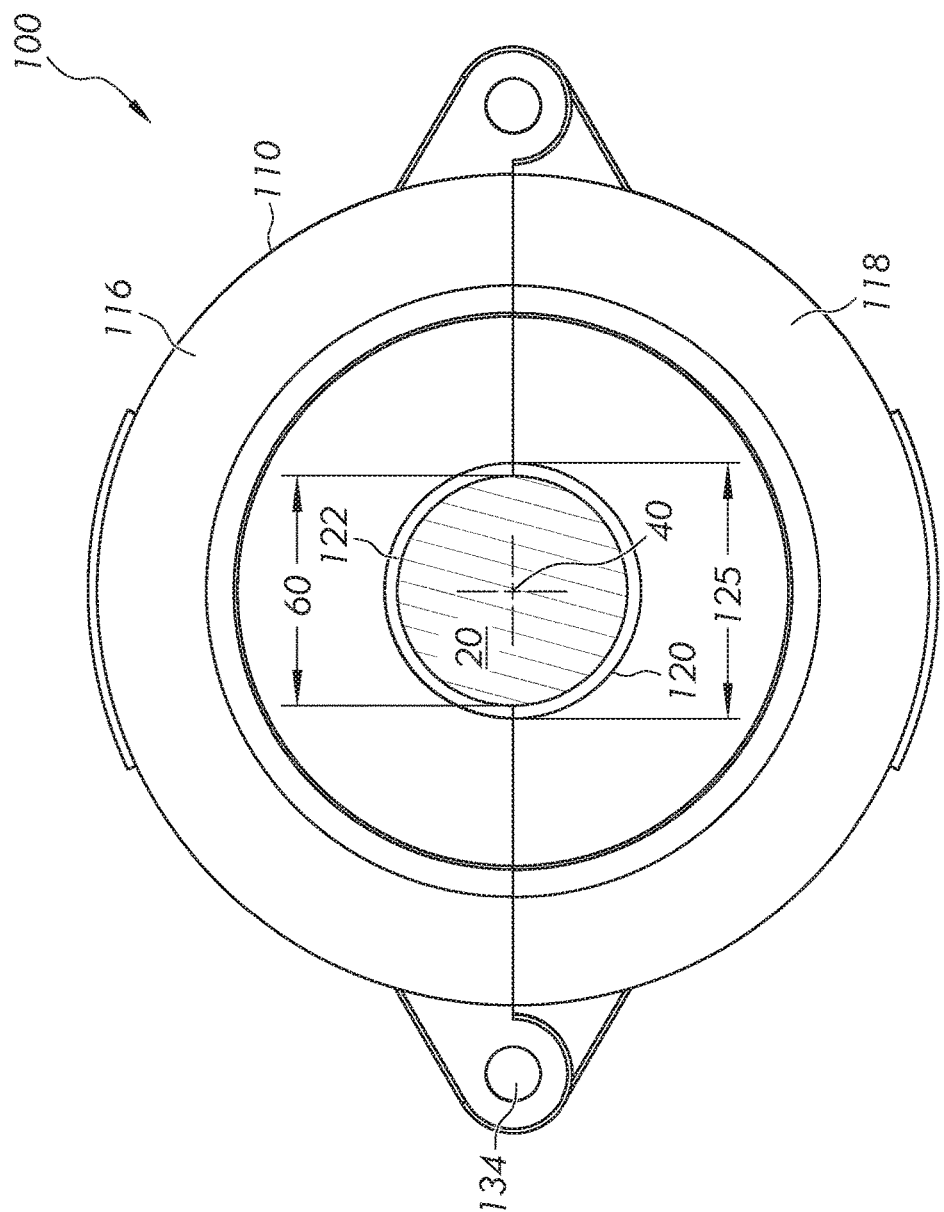
FIG. 3 is a back view of the lockout device of FIG. 2A.

FIG. 3 is a back view of the lockout device of FIG. 2A, according to an embodiment of the present disclosure. Also included, is a section view of the valve operation shaft 20, for illustration purposes. As above, the valve operation shaft 20 may have the shaft diameter 60, normal to the shaft axis 40, and further, the valve operation shaft 20 may pass through the aperture 122 of the shaft interface 120 when the lockout device 100 is installed. Also as above the rotating valve handle 30 has the maximum handle diameter 80 (FIG. 1), which may also be normal to the shaft axis 40.

As above, the handle cover 110 may enclose rotating valve handle 30 (FIG. 1) about shaft axis 40 such that handle cover 110 does not engage rotating valve handle 30, with the handle cover 110 being configured to restrict access to rotating valve handle 30. Similarly, the aperture 122 of the shaft interface 120 may circumscribe the valve operation shaft 20 without engaging valve operation shaft 20.

The aperture 122 may have a minimum aperture dimension and a maximum aperture dimension, both measured normal to the shaft axis 40. As shown here, as a circle, both the maximum and minimum aperture dimension converge to an aperture diameter 125, normal to the shaft axis 40. According to one embodiment, the aperture of the minimum aperture dimension (here, aperture diameter 125) is greater than the shaft diameter 60, and a maximum aperture diameter (here, aperture diameter 125) is less than the maximum handle diameter 80. According to another embodiment, the minimum aperture diameter (here, aperture diameter 125) may be between zero and fifteen percent greater than the shaft diameter 60.

According to one embodiment, the lockout device 100 is bifurcated such that lockout device 100 is further defined by first clamshell member 116, second clamshell member 118, and hinge 134 pivotably connecting first clamshell member 116 and second clamshell member 118. First clamshell member 116 and second clamshell member 118 are configured to pivotably open about hinge 134 by at least 90 degrees. Aperture 122 is also bifurcated, and is configured to pivotably open about hinge 134 by at least 90 degrees.

FIG. 4 is a cutaway view of the lockout device of FIG. 2B, along line 4-4, according to an embodiment of the present disclosure, illustrating the construction of first clamshell member 116 and second clamshell member 118, according to one embodiment. Here, the first clamshell member 116 and second clamshell member 118 are shown as being bifurcated. Handle cover 110, shaft interface 110, and viewport 130 are also bifurcated.

As above, the first clamshell member 116 and second clamshell member 118 further define cavity 112 when first clamshell member 116 and second clamshell member 118 are closed. As discussed above, the cavity 112 is sufficiently dimensioned and shaped to circumscribe the rotating valve handle 30 (FIG. 1) upon installation of first clamshell member 116 and second clamshell member 118 about the rotating valve handle 30 (FIG. 1) in any manipulated orientation.

Figure 5:
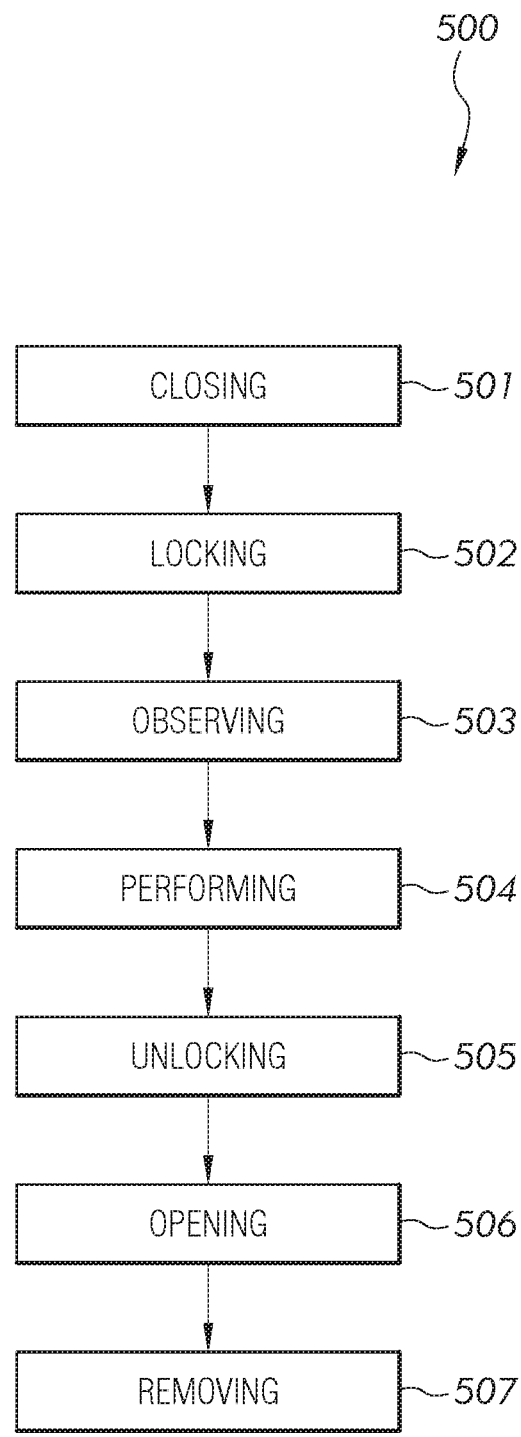
FIG. 5 is a flow diagram illustrating a method of use for securing a valve during maintenance tasks, according to an embodiment of the present disclosure.

FIG. 5 is a flow diagram illustrating a method for securing a valve during maintenance tasks, according to an embodiment of the present disclosure. In particular, the method for securing a valve during maintenance tasks 500 may include one or more components or features of the lockout device 100 as described above. As illustrated, the method for securing a valve during maintenance tasks 500 may include the steps of: step one 501, closing first clamshell member 116 and second clamshell member 118 of lockout device 100 about rotating valve handle 30, such that closed first clamshell member 116 and second clamshell member 118 enclose rotating valve handle 30 while permitting passage of valve operation shaft 20 through closed first clamshell member 116 and second clamshell member 118; step two 502, locking first clamshell 116 and second clamshell member 118 together about rotating valve handle 30 in closed position; step three 503, observing an operational state of valve 10 through viewport 130 of lockout device 100; step four 504, performing a maintenance task; step five 505, unlocking first clamshell member 116 and second clamshell member 118 from each other; step six 506, opening first clamshell member 116 from second clamshell member 118 from about rotating valve handle 30; and step seven 507, removing lockout device 100 from rotating valve handle 30.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for securing a valve during maintenance tasks, are taught herein.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A lockout device for locking out a valve having a valve operation shaft and a valve handle that is mounted to the valve operation shaft, the lockout device comprising:
    a handle cover sized to enclose the valve handle to prevent rotation of the valve handle, the handle cover including:
        two housing members, each housing member having a first end opposite a second end, a concave side, and a convex side, each housing member including a first arm protruding from the convex side at the first end, and a second arm protruding from the convex side at the second end, and the two housing members configured to engage via alignment of the respective concave sides such that:
            a cavity is formed between the respective concave sides,
            the first end of a first housing member of the two housing members is aligned with the second end of a second housing member of the two housing members, and
            the first arm and the second arm of the first housing member are disposed adjacent to the second arm and the first arm, respectively, of the second housing member; and
    a viewport member disposed between the two housing members, the viewport member being transparent such that an open or closed condition of the valve is visible to a user when the handle cover is installed on the valve handle, and the viewport member including a first piece and a second piece disposed in a first housing member and a second housing member, respectively, of the two housing members,
    wherein a cross-sectional profile of a first portion of a perimeter of the first piece is shaped different than a cross-sectional profile of a second portion of the perimeter of the first piece such that the first portion of the perimeter of the first piece removably interlocks coplanarly with a joint interface in the first housing member, and
    wherein a cross-sectional profile of a first portion of the perimeter of the second piece is shaped different than a cross-sectional profile of a second portion of the perimeter of the second piece such that the first portion of the perimeter of the second piece removably interlocks coplanarly with a joint interface in the second housing member.

2. The lockout device according to claim 1, wherein the first arm and the second arm on each of the two housing members includes a through hole, the respective through holes of the respective first arms and second arms of the two housing members being aligned coaxially when the two housing members are engaged.

3. The lockout device according to claim 1, wherein the two housing members are pivotally hinged together at a pivot point between the first arm of the first housing member and the second arm of the second housing member.

4. The lockout device according to claim 1, wherein the through hole in the second arm of the first housing member and the through hole of the first arm of the second housing member are sized to accommodate a shackle of a padlock therethrough.

5. The lockout device according to claim 1, further comprising a shaft interface member disposed between the two housing members opposite the viewport member, the shaft interface member including an aperture having a diameter larger than a diameter of the valve operation shaft.

6. The lockout device according to claim 1, wherein each of the two housing members further includes a third arm that protrudes from the first end of the convex side in parallel to the first arm.

7. The lockout device according to claim 6, wherein, when the two housing members are engaged, the second arm of the first housing member is positioned between the first arm of the second housing member and the third arm of the second housing member.

8. A lockout device, comprising:
   a clamshell housing hinged on a first side, the clamshell housing including:
      at least one arm extending outward from each half, respectively, of the clamshell housing on a second side opposite the first side, the at least one arm of each half extending so as to align in parallel when the clamshell housing is closed and so as to accommodate a shackle of a lock through the at least one arm of each half,
      a first viewport member defining a first wall portion of a third side of the clamshell housing that extends between the first side and the second side, the first viewport member being disposed with a first half of the clamshell housing, and the first viewport including an indent disposed along a perimeter thereof, and
      a second viewport member defining a second wall portion of the third side of the clamshell housing, the second viewport member disposed with a second half of the clamshell housing, and the second viewport including a detent disposed along a perimeter thereof such that, when the clamshell housing is closed, the detent of the second viewport engages the indent of the first viewport,
   wherein a cross-sectional profile of a first portion of a perimeter of the first viewport member is shaped different than a cross-sectional profile of a second portion of the perimeter of the first viewport member such that the first portion of the perimeter of the first viewport member removably interlocks coplanarly with a joint interface in the first wall portion of the third side of the clamshell housing,
   wherein a cross-sectional profile of a first portion of a perimeter of the second viewport member is shaped different than a cross-sectional profile of a second portion of the perimeter of the second viewport member such that the first portion of the perimeter of the second viewport member removably interlocks coplanarly with a joint interface in the second wall portion of the third side of the clamshell housing, and
   wherein a material of the first viewport member and the second viewport member is transparent.

9. The lockout device according to claim 8, wherein the at least one arm of the second half of the clamshell housing includes a first arm and a second arm disposed parallel to each other.

10. The lockout device according to claim 8, wherein the clamshell housing further includes:
    a first shaft interface member defining a first wall portion of a fourth side of the clamshell housing that extends between the first side and the second side and is opposite the third side, the first shaft interface member being disposed with the first half of the clamshell housing, and
    a second shaft interface member defining a second wall portion of the fourth side of the clamshell housing that extends between the first side and the second side and is opposite the third side, the first shaft interface member being disposed with the first half of the clamshell housing.

11. The lockout device according to claim 10, wherein each of the first shaft interface member and the second shaft interface member have a corresponding void to accommodate a valve shaft therethrough.

12. The lockout device according to claim 8, wherein the clamshell housing is hinged via a pivot joint through at least one arm extending from each half, respectively.

13. The lockout device according to claim 8, wherein the joint interface in the first wall portion and in the second wall portion is a groove inset within an edge thereof, respectively.

14. The lockout device according to claim 13, wherein the groove is shaped with a slot leading to a cavity that is wider than a width of the slot.

* * * * *